United States Patent
Matsumoto et al.

(10) Patent No.: US 9,442,295 B2
(45) Date of Patent: Sep. 13, 2016

(54) BEAM-SHAPING DEVICE

(71) Applicant: HAMAMATSU PHOTONICS K.K., Hamamatsu-shi, Shizuoka (JP)

(72) Inventors: Naoya Matsumoto, Hamamatsu (JP); Takashi Inoue, Hamamatsu (JP); Yuu Takiguchi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/395,148

(22) PCT Filed: Apr. 18, 2013

(86) PCT No.: PCT/JP2013/061508
§ 371 (c)(1),
(2) Date: Oct. 17, 2014

(87) PCT Pub. No.: WO2013/157605
PCT Pub. Date: Oct. 24, 2013

(65) Prior Publication Data
US 2015/0049376 A1    Feb. 19, 2015

(30) Foreign Application Priority Data
Apr. 20, 2012   (JP) .................... 2012-096818

(51) Int. Cl.
*G02B 26/00*    (2006.01)
*G02F 1/01*    (2006.01)
(Continued)

(52) U.S. Cl.
CPC .......... *G02B 27/0927* (2013.01); *G02B 26/06* (2013.01); *G02B 27/0938* (2013.01); *G02F 1/19* (2013.01); *G02B 21/16* (2013.01); *G02F 2203/50* (2013.01)

(58) Field of Classification Search
CPC ... G02B 26/06; G11B 7/128; G02F 2203/12; G02F 1/133553; G02F 1/292
USPC .................... 359/11, 238–297, 300
See application file for complete search history.

(56) References Cited

U.S. PATENT DOCUMENTS

2010/0232005 A1*  9/2010  Lescure ............... G02B 27/104
                                                              359/279

FOREIGN PATENT DOCUMENTS

| JP | H6-222300 | 8/1994 |
| JP | 2008-542795 | 11/2008 |
| WO | WO 2006/035775 | 4/2006 |

OTHER PUBLICATIONS

English-language translation of International Preliminary Report on Patentability (IPRP) dated Oct. 30, 2014 that issued in WO Patent Application No. PCT/JP2013/061508.

(Continued)

*Primary Examiner* — Mahidere Sahle
(74) *Attorney, Agent, or Firm* — Drinker Biddle & Reath LLP

(57) ABSTRACT

A beam shaping device includes a first phase modulation unit including a phase-modulation type SLM, and displaying a first phase pattern for modulating a phase of input light, a second phase modulation unit including a phase-modulation type SLM, being optically coupled to the first phase modulation unit, and displaying a second phase pattern for further modulating a phase of light phase-modulated by the first phase modulation unit, and a control unit providing the first and second phase patterns to the first and second phase modulation units, respectively. The first and second phase patterns are phase patterns for approximating an intensity distribution and a phase distribution of light output from the second phase modulation unit, to predetermined distributions.

6 Claims, 13 Drawing Sheets

(51) Int. Cl.
*G02B 27/09* (2006.01)
*G02B 26/06* (2006.01)
*G02F 1/19* (2006.01)
*G02B 21/16* (2006.01)

(56) References Cited

OTHER PUBLICATIONS

Jesacher, A., et al., "Near-Perfect Hologram Reconstruction with a Spatial Light Modulator," Optics Express, vol. 16, No. 4, 2008, pp. 2597-2603.

Jesacher, A., et al., "Full Phase and Amplitude Control of Holographic Optical Tweezers with High Efficiency," Optics Express, vol. 16, No. 7, 2008, pp. 4479-4486.

Haotong, Ma, et al., "Near-Diffraction-Limited Annular Flattop Beam Shaping with Dual Phase Only Liquid Crystal Spatial Light Modulators," Optics Express, vol. 18, No. 8, Apr. 12, 2010, pp. 8251-8260.

Haotong, Ma, et al., "Adaptive Conversion of Multimode Beam to Near-Diffraction-Limited Flattop Beam Based on Dual-Phase-Only Liquid-Crystal Spatial Light Modulators," Optics Express, vol. 18, No. 26, Dec. 20, 2010, pp. 27723-27730.

Haotong, Ma, et al., "Adaptive Generation of a Near-Diffraction-Limited Square Flattop Beam with Dual Phase Only Liquid Crystal Spatial Light Modulators," Journal of Optics, vol. 13, No. 1, Jan. 7, 2011, pp. 015707-1 to 015707-7.

\* cited by examiner

Fig.8
(a) 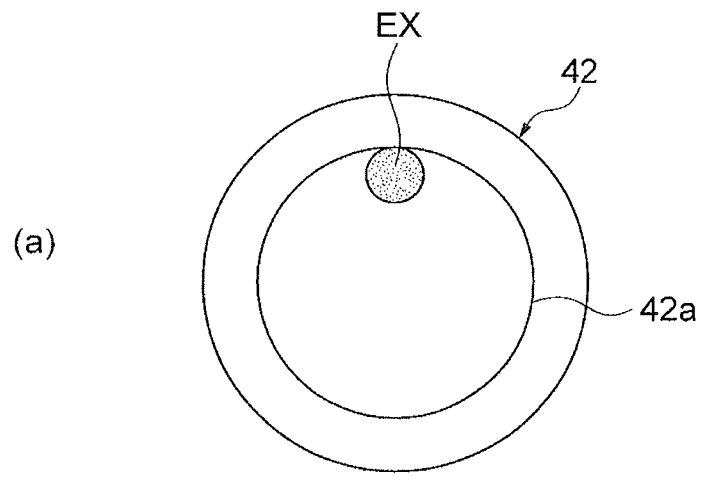
(b) 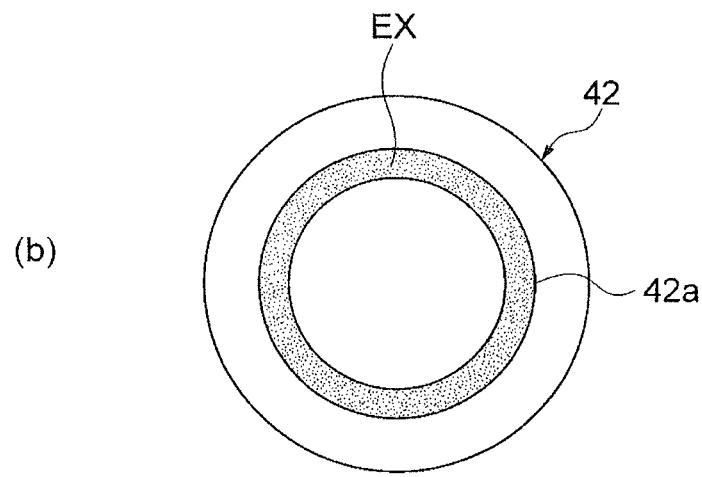

US 9,442,295 B2

BEAM-SHAPING DEVICE

TECHNICAL FIELD

The present invention relates to a beam shaping device.

BACKGROUND ART

A method using a spatial light modulator for holography irradiation with low noise is described in Non-Patent Documents 1 and 2. In this method, one spatial light modulator is disposed on a Fourier plane, thereby independently controlling amplitude and a phase distribution of light respectively.

CITATION LIST

Non Patent Literature

Non-Patent Document 1: A. Jesacher et al., "Near-perfect hologram reconstruction with a spatial light modulator," Optics Express, Vol. 16, No. 4, pp. 2597-2603 (2008)

Non-Patent Document 2: A. Jesacher et al., "Full phase and amplitude control of holographic optical tweezers with high efficiency," Optics Express, Vol. 16, No. 7, pp. 4479-4486 (2008)

SUMMARY OF INVENTION

Technical Problem

A homogenizer has been conventionally known as a device which converts, for example, input light having an intensity distribution according to a Gaussian distribution into light having a top-hat shaped intensity distribution. The homogenizer is composed of two pieces of glass (lenses) into which a phase pattern is written by etching. However, in such a configuration, it is difficult to arbitrarily change an intensity distribution of output light.

Then, the use of a spatial light modulator which is capable of arbitrarily changing a phase pattern by an electrical signal is considered. In particular, in the case where an attempt is made to hold down an optical loss, a phase-modulation type spatial light modulator is suitable. However, because a phase-modulation type spatial light modulator is incapable of singly performing intensity modulation, an intensity distribution of input light remains to be an intensity distribution of output light. Accordingly, it is extremely difficult to perform conversion into light with an arbitrary cross sectional shape and an arbitrary intensity distribution, for example, such as converting input light having an intensity distribution according to a Gaussian distribution, into light whose cross section is square, and which has a top-hat shaped intensity distribution, or converting input light whose cross section is circular, and which has a top-hat shaped intensity distribution, into light whose cross section is square, and which has a top-hat shaped intensity distribution.

The present invention has been achieved in view of the above problem, and an object thereof is to provide a beam shaping device which is capable of conversion into light with an arbitrary cross sectional shape and intensity distribution.

Solution to Problem

In order to solve the above-described problem, a beam shaping device according to the present invention includes a first phase modulation unit including a phase-modulation type spatial light modulator, and displaying a first phase pattern for modulating a phase of input light, a second phase modulation unit including a phase-modulation type spatial light modulator, being optically coupled to the first phase modulation unit, and displaying a second phase pattern for further modulating a phase of light phase-modulated by the first phase modulation unit, and a control unit providing the first phase pattern and the second phase pattern to the first phase modulation unit and the second phase modulation unit, respectively, and in the beam shaping device, the first phase pattern and the second phase pattern are phase patterns for approximating an intensity distribution and a phase distribution of light output from the second phase modulation unit, to predetermined distributions.

In this beam shaping device, the first phase modulation unit and the second phase modulation unit which are respectively composed of phase-modulation type spatial light modulators are optically coupled, and input light is incident into the first phase modulation unit, and output light is taken out of the second phase modulation unit. Then, for example, the first phase pattern for providing a predetermined intensity distribution is displayed on the first phase modulation unit, and the light having the predetermined intensity distribution is incident into the second phase modulation unit. At this time, for example, a predetermined phase distribution is provided to the second phase modulation unit. Thereby output light having an arbitrary cross sectional shape and an arbitrary intensity distribution is obtained. In this way, by use of two phase-modulation type spatial light modulators, it is possible to arbitrarily control not only a phase distribution, but also an intensity distribution. That is, in accordance with this beam shaping device, it is possible to perform conversion into light with an arbitrary (dynamic) cross sectional shape and intensity distribution.

Advantageous Effects of Invention

In accordance with the beam shaping device according to the present invention, it is possible to perform conversion into light with an arbitrary cross sectional shape and an arbitrary intensity distribution.

BRIEF DESCRIPTION OF DRAWINGS

FIG. 8 includes (a) a diagram showing an example of excitation light in a conventional TIRF microscope, which is a diagram schematically showing a situation in which an exit pupil of an objective lens is observed from the optical axis direction, and (b) a diagram showing a situation of excitation light in a third modification, which is a diagram schematically showing a situation in which an exit pupil of the objective lens is observed from the optical axis direction.

DESCRIPTION OF EMBODIMENTS

Hereinafter, embodiments of a beam shaping device according to the present invention will be described in detail with reference to the accompanying drawings. In addition, in the description of the drawings, the same components are denoted by the same reference symbols, and overlapping descriptions will be omitted.

First Embodiment

Figure 1:
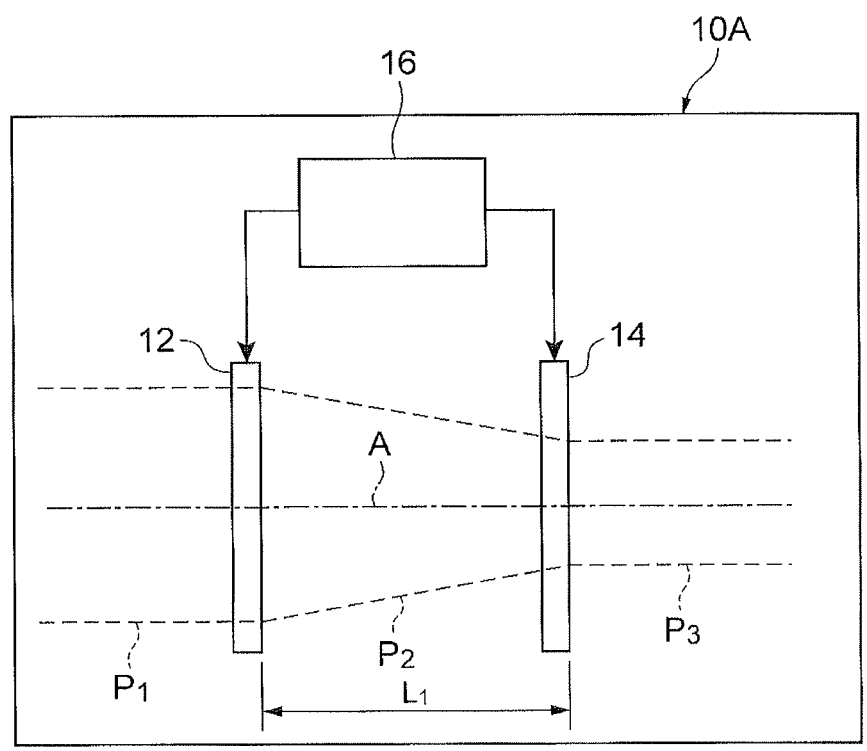
FIG. 1 is a diagram showing a configuration of a beam shaping device according to a first embodiment.

FIG. 1 is a diagram showing a configuration of a beam shaping device 10A according to a first embodiment of the present invention. The beam shaping device 10A according to the present embodiment includes a first phase modulation unit 12, a second phase modulation unit 14, and a control unit 16. The first phase modulation unit 12 and the second phase modulation unit 14 are disposed in line in a direction along an optical axis A of input light to be input to the beam shaping device 10A, and the second phase modulation unit 14 is optically coupled to the first phase modulation unit 12. In addition, as shown in another embodiment which will be described later, an optical component such as a lens or a reflecting mirror may be interposed between the first phase modulation unit 12 and the second phase modulation unit 14.

In this beam shaping device 10A, the first phase modulation unit 12 displays a first phase pattern for modulating a phase of input light $P_1$. Further, the second phase modulation unit 14 displays a second phase pattern for further modulating a phase of light $P_2$ phase-modulated by the first phase modulation unit 12. The first phase pattern and the second phase pattern are phase patterns for approximating an intensity distribution and a phase distribution of light $P_3$ output from the second phase modulation unit 14, to predetermined (desired) distributions.

The input light $P_1$ is, for example, parallel light, and is incident from the front face (a surface on the opposite side to a surface facing the second phase modulation unit 14) of the first phase modulation unit 12. Then, this input light $P_1$ is converted into the light $P_3$ with an arbitrary cross sectional shape by the first phase modulation unit 12 and the second phase modulation unit 14, and the light $P_3$ is output from the back face (a surface on the opposite side to a surface facing the first phase modulation unit 12) of the second phase modulation unit 14. In addition, a cross section perpendicular to an optical axis of the input light $P_1$ is typically circular, and an intensity distribution of the input light $P_1$ is typically a Gaussian distribution.

The first phase modulation unit 12 includes a spatial light modulator (SLM: Spatial Light Modulator). Further, the second phase modulation unit 14 as well includes a spatial light modulator in the same way. As a spatial light modulator which is usable as the first phase modulation unit 12 and the second phase modulation unit 14, there is a phase-modulation type spatial light modulator, for example, a refractive-index changing material type SLM (for example, as an SLM using a liquid crystal, an LCOS (Liquid Crystal on Silicon) type, an LCD (Liquid Crystal Display), or the like), a segment mirror type SLM, a continuous deformable mirror type SLM, or the like. A refractive-index changing material type SLM, a segment mirror type SLM, and a continuous deformable mirror type SLM function as a lens which is provided with a variety of lens patterns by applying a voltage, an electric current, or writing light, thereby having an arbitrary focal length. In addition, a transmission type spatial light modulator is exemplified in the present embodiment, however, the spatial light modulator may be a reflection type spatial light modulator.

Further, in the beam shaping device 10A according to the present embodiment, a distance $L_1$ between the first phase modulation unit 12 and the second phase modulation unit 14 is invariable, and the positions of the first phase modulation unit 12 and the second phase modulation unit 14 are relatively fixed with respect to an optical component (not shown) provided at the subsequent stage.

The control unit 16 provides the first phase pattern to the first phase modulation unit 12, and provides the second phase pattern to the second phase modulation unit 14. In detail, the control unit 16 provides an electrical signal (a phase pattern) for driving the respective pixels of the spatial light modulators to the first phase modulation unit 12 and the second phase modulation unit 14. In the beam shaping device 10A, the control unit 16 dynamically changes the phase patterns for the first phase modulation unit 12 and the second phase modulation unit 14 in this way, thereby changing the intensity distribution of the light $P_2$ incident into the second phase modulation unit 14, and arbitrarily modulating the intensity and phase distributions of the light $P_3$ emitted from the beam shaping device 10A. In addition, the control unit 16 may be disposed in a housing in which the first phase modulation unit 12 and the second phase modulation unit 14 are housed, or may be disposed outside the housing.

Hereinafter, a specific example of a method of preparing a first phase pattern and a second phase pattern which are respectively provided to the first phase modulation unit 12 and the second phase modulation unit 14 by the control unit 16 will be described.

First, in order to determine a phase distribution $\phi_1$ to be displayed on the first phase modulation unit 12, information on an intensity distribution $I_{1in}$ (an amplitude distribution $A_{1in}$) of the light $P_{1in}$ incident into the first phase modulation unit 12 is acquired. In addition, the amplitude distribution $A_{1in}$ and the intensity distribution $I_{1in}$ of the light $P_1$ have the relationship shown in the following formula (1).

[Formula 1]

$$I_{1in} = |A_{1in}|^2 \qquad (1)$$

Next, an intensity distribution $I_{2in}$ (an amplitude distribution $A_{2in}$) of the light $P_2$ to be incident into the second phase modulation unit 14 is set. Then, after the intensity distributions $I_{1in}$ and $I_{2in}$ (the amplitude distributions $A_{1in}$ and $A_{2in}$) are acquired, a first phase pattern including the phase distribution $\phi_1$ to be displayed on the first phase modulation unit 12 is determined by use of, for example, an iterative Fourier method such as a GS (Gerchberg & Saxton) method or an OC method, or a CGH (Computer Generated Hologram) design method such as an ORA (Optimal Rotation Angle) method. Due to the first phase modulation unit 12 displaying such a first phase pattern, the light $P_2$ having the desired intensity distribution $I_{2in}$ (the amplitude distribution $A_{2in}$) is to be incident into the second phase modulation unit 14 which is separated by a distance $L_1$ from the first phase modulation unit 12. In addition, a phase distribution $\phi_{2in}$ of the light $P_2$ reaching the second phase modulation unit 14 is determined on the basis of phase modulation in the first phase modulation unit 12, and a propagation process from the first phase modulation unit 12. This phase distribution $\phi_{2in}$ is determined by simulating a situation of propagation of the light $P_2$.

Next, a target pattern $A_{tgt}$ is set in order to determine a second phase pattern including a phase distribution $\phi_2$ to be displayed on the second phase modulation unit 14. Here, a target pattern means a distribution of one or more light condensing points which are reproduced by performing Fourier transform of the light $P_3$ output from the beam shaping device 10A by the lens disposed at the subsequent stage of the beam shaping device 10A. Further, an intensity distribution $I_{2in}$ (an amplitude distribution $A_{2in}$) of the light $P_2$ incident into the second phase modulation unit 14 is set. After the target pattern $A_{tgt}$ and the amplitude distribution $A_{2in}$ are set in this way, a second phase pattern including the phase distribution $\phi_2$ to be displayed on the second phase modulation unit 14 is determined by use of, for example, an iterative Fourier method such as a GS method or an OC method, or, for example, a CGH design method such as an ORA method. At this time, it is preferable to determine a second phase pattern including the phase distribution $\phi_2$ to be displayed on the second phase modulation unit 14 in the case where, for example, the light $P_2$ incident into the second phase modulation unit 14 is a plane wave. However, in reality, when the light $P_2$ which is phase-modulated by the first phase modulation unit 12 to propagate is incident into the second phase modulation unit 14, its phase distribution $\phi_{2in}$ is not a plane wave. Accordingly, it is preferable to determine a second phase pattern including the phase distribution $\phi_2$ to be displayed on the second phase modulation unit 14 by performing processing shown in the following formula (2).

[Formula 2]

$$\phi_2 = \phi_{2\_out} - \phi_{2\_in} \quad (2)$$

In this processing shown in the formula (2), the phase distribution $\phi_{2in}$ of the light $P_2$ is cancelled by the second phase modulation unit 14, and a new phase pattern is further added.

In addition, at the time of determining a first phase pattern to be displayed on the first phase modulation unit 12, the processing which is the same as that described above may also be carried out. That is, when a phase distribution $\phi_{1in}$ of the light $P_1$ incident into the first phase modulation unit 12 is not a plane wave, it is preferable to determine the phase distribution $\phi_1$ of the first phase pattern to be displayed on the first phase modulation unit 12 by the following formula (3).

[Formula 3]

$$\phi_1 = \phi_{1\_out} - \phi_{1\_in} \quad (3)$$

Further, the first phase pattern to be displayed on the first phase modulation unit 12 may be a phase pattern having a lens effect. Then, in the case where the first phase pattern has a lens effect, a focal length f of the lens effect is preferably, not equal to the distance $L_1$ between the first phase modulation unit 12 and the second phase modulation unit 14, longer or shorter than the distance $L_1$. This is because, when the focal length f and the distance $L_1$ are equal to one another, a light condensing point of the light $P_2$ overlaps the second phase modulation unit 14, there may be an effect on operations of the second phase modulation unit 14. Due to the focal length f being longer or shorter than the distance $L_1$, it is possible to bring a light condensing point of the light $P_2$ to be out of the second phase modulation unit 14, so as to favorably operate the second phase modulation unit 14.

The control unit 16 respectively provides the first phase pattern and the second phase pattern which are prepared by the above method, to the first phase modulation unit 12 and the second phase modulation unit 14, thereby displaying an appropriate phase pattern on the first phase modulation unit 12, it is possible to change an intensity distribution of the light $P_2$ incident into the second phase modulation unit 14, and approximate an intensity distribution and a phase distribution of the light $P_3$ output from the second phase modulation unit 14, to desired shapes.

Further, in accordance with this beam shaping device 10A, it is possible to enhance the light use efficiency which is a ratio of the input light $P_1$ and the output light $P_3$. For example, in the case where an intensity mask such as an LCD is used as the first phase modulation unit 12, although it is easy to adjust an intensity distribution, in some cases, the light use efficiency may be extremely decreased depending on the relationship between an intensity distribution of the input light $P_1$ and an intensity distribution of the light $P_2$. On the other hand, in the beam shaping device 10A, because the first phase modulation unit 12 is composed of a spatial light modulator, and changes only a phase distribution of the input light $P_1$, it is possible to effectively inhibit a decrease in light use efficiency.

Here, a specific example of an optical system including the beam shaping device 10A according to the present embodiment will be described. Generally, an intensity distribution of light incident into a lens has an effect on a shape of a condensed light spot of light passing through the lens. For example, in the case where an intensity distribution of light incident into a lens is a uniform top-hat shape, an Airy pattern appears in a condensed light spot. Further, in the case where an intensity distribution of light incident into a lens is a Gaussian distribution, a Gaussian shape condensed light image appears in a condensed light spot. In this way, by actively changing an intensity distribution of light incident into a lens, it is possible to acquire condensed light spots of a variety of shapes. Then, such specially-shaped condensed light spots may be useful for the purposes of laser processing, laser microscopes, and the like.

Figure 2:
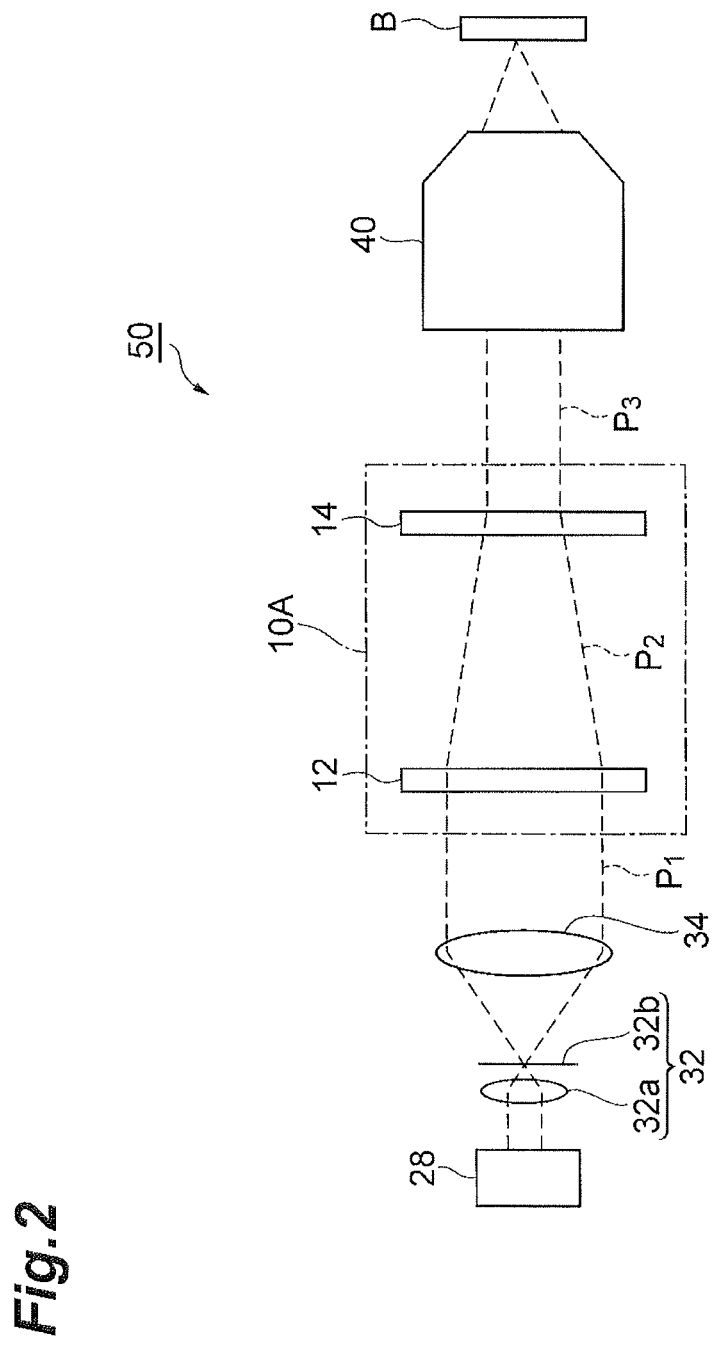
FIG. 2 is a diagram showing an example of an optical system including the beam shaping device.

FIG. 2 is a diagram showing an example of an optical system including the beam shaping device 10A. An optical system 50 shown in FIG. 2 includes the beam shaping device 10A, a laser light source 28, a spatial filter 32, a collimating lens 34, and an objective lens 40.

The input light $P_1$ is input to the first phase modulation unit 12. The input light $P_1$ is appropriately generated, for example, such that laser light emitted from the laser light source 28 passes through a condensing lens 32a and a pinhole 32b of the spatial filter 32 so as to eliminate wavefront noise and distortion, and thereafter passes through the collimating lens 34, to be parallelized. In addition, the optical system 50 may include a beam expander which expands (or reduces) a diameter of laser light emitted from the laser light source 28, in place of the spatial filter 32.

Then, an intensity distribution and a phase distribution of this input light $P_1$ are arbitrarily changed by the first phase modulation unit 12 and the second phase modulation unit 14, and output light $P_3$ is output from the back face (a surface on the opposite side to a surface facing the first phase modulation unit 12) of the second phase modulation unit 14. The output light $P_3$ is incident into an exit pupil of the objective lens 40, and is condensed at the objective lens 40. In addition, an object B to be observed or processed, etc., is disposed on its light condensing point.

Figure 3:
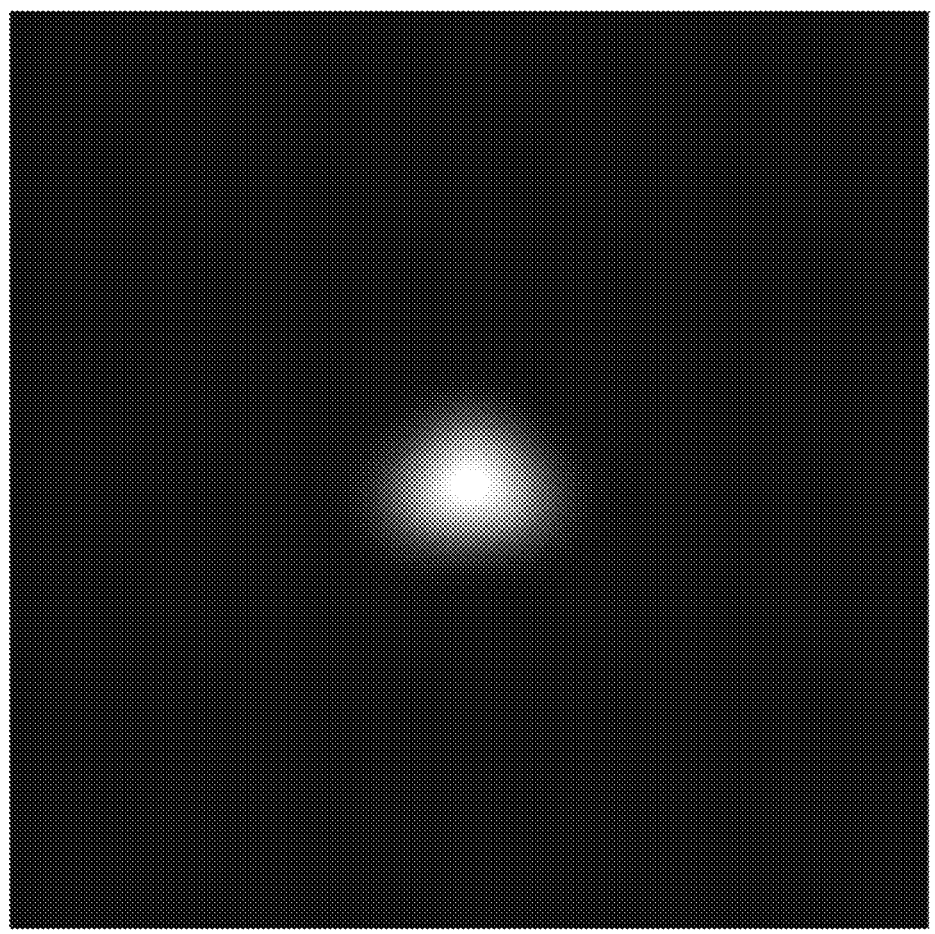
FIG. 3 is a diagram showing an example of an intensity distribution of light incident into a second phase modulation unit.
Figure 4:
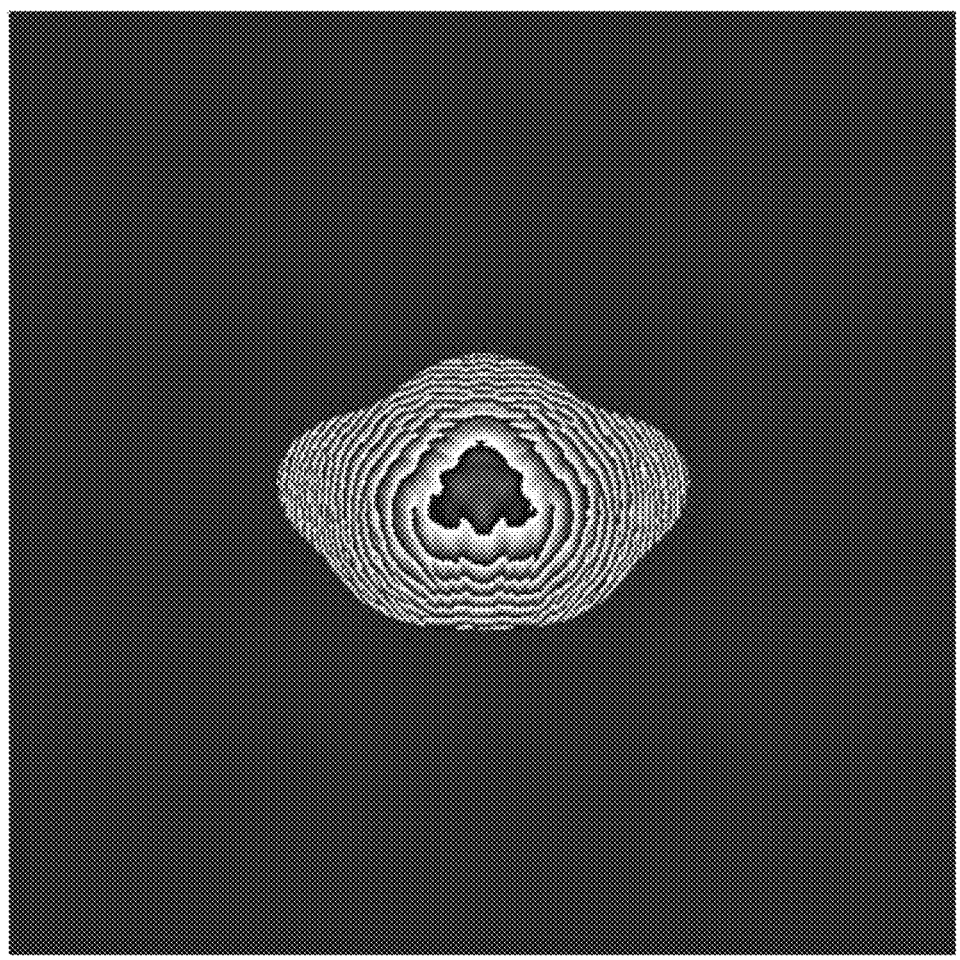
FIG. 4 is a diagram showing an example of a second phase pattern provided to the second phase modulation unit.
Figure 5:
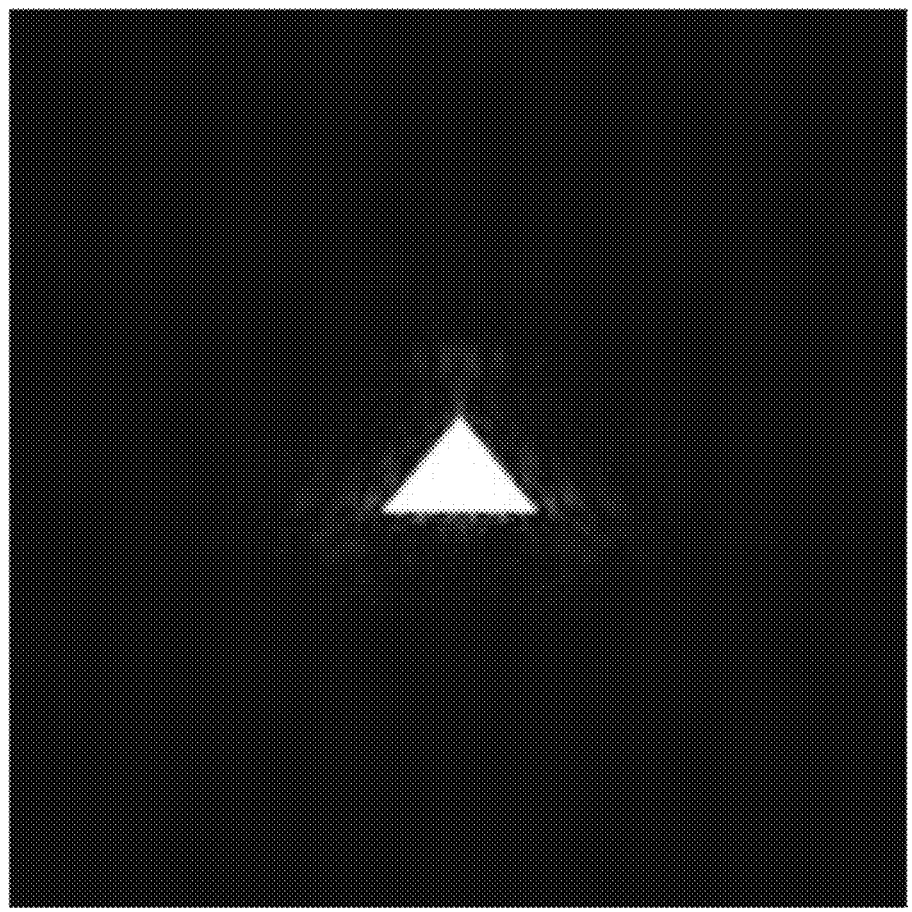
FIG. 5 is a diagram showing an example of a shape of a cross section perpendicular to an optical axis direction of output light.

In this optical system 50, for example, when phase patterns are provided to the first phase modulation unit 12 and the second phase modulation unit 14 as in the embodiment described above, it is possible to acquire an arbitrary condensed light shape in a condensed light spot of the output light $P_3$. For example, a case where the input light $P_1$ having a Gaussian distribution shaped intensity distribution is modulated by the first phase pattern in the first phase modulation unit 12, and the light $P_2$ having an intensity distribution shown in FIG. 3 is incident into the second phase modulation unit 14 is considered. At this time, when a phase pattern as shown in FIG. 4 is provided as a second phase pattern to the second phase modulation unit 14, it is possible to make a shape of a cross section perpendicular to the optical axis direction of the light $P_3$ in a condensed light spot into a polygonal shape (for example, a triangular shape) as shown in FIG. 5. Moreover, it is possible to make an intensity distribution of the light $P_3$ in the cross section into a top-hat shape.

Such formation of a condensed light spot having an arbitrary shape and an arbitrary intensity distribution enables high-speed processing of a plane of an object in the field of processing for example, and enables planar light stimulation onto a specific location of an object in the field of microscopic observation.

In addition, in the optical system 50 shown in FIG. 2, as long as at least the light source 28, the beam shaping device 10A, and the objective lens 40 are provided, any other various modifications are conceivable. For example, an observation unit for a processing situation or microscopic observation may be attached, or a stage for moving or rotating an object may be further provided.

First Modification

In the embodiment described above, the light $P_3$ output from the beam shaping device 10A is condensed by the objective lens 40, however, the objective lens 40 may be omitted. That is, the second phase pattern to be displayed on the second phase modulation unit 14 preferably includes a phase pattern having a condensing lens effect for making the light $P_3$ into converging light, in place of the objective lens 40. In accordance with such a configuration, it is possible to appropriately condense the light $P_3$. Or, the second phase pattern may include a phase pattern for making the light $P_3$ into diffusing light, as needed.

Second Modification

Figure 6:
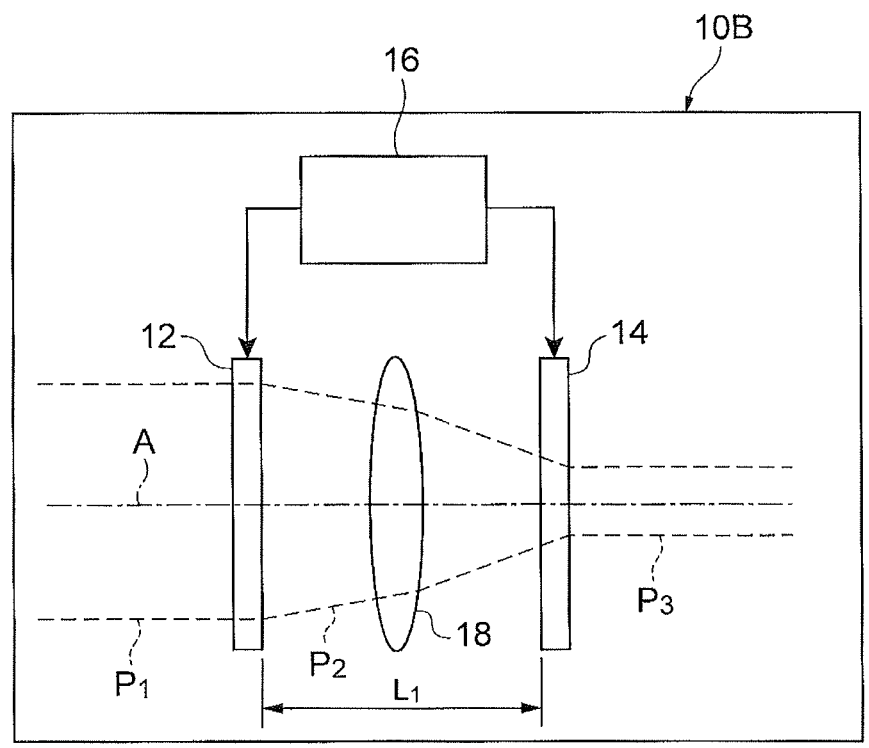
FIG. 6 is a diagram showing a configuration of a second modification.

FIG. 6 is a diagram showing a configuration of a second modification of the embodiment described above. In the same way as the beam shaping device 10A according to the embodiment described above, a beam shaping device 10B according to the present modification includes the first phase modulation unit 12, the second phase modulation unit 14, and the control unit 16. Then, the beam shaping device 10B according to the present modification further includes a lens 18.

The lens 18 is disposed between the first phase modulation unit 12 and the second phase modulation unit 14, and condenses (or diffuses) the light $P_2$ emitted from the first phase modulation unit 12, to provide the light $P_2$ to the second phase modulation unit 14. There is a lower limit as a focal length of a lens which may be realized by a spatial light modulator, however, by combining the lens 18 as in the present modification, it is possible to set a focal length in excess of the lower limit.

In addition, in this case, a focal length f of the lens effect included in the second phase pattern to be displayed on the second phase modulation unit 14 may be the same as the distance $L_1$, meanwhile, a combined focal length of the lens effect included in the first phase pattern of the first phase modulation unit 12 and the lens 18 is preferably different from the distance $L_1$ (longer or shorter than the distance $L_1$). In accordance with this, even in the case where high-power laser light is used in the field of processing or for the purpose of a microscope, etc., it is possible to prevent the laser light from being condensed on the spatial light modulator, and to maintain an appropriate operation of the spatial light modulator.

Third Modification

The first phase pattern and the second phase pattern which are respectively provided to the first phase modulation unit 12 and the second phase modulation unit 14 by the control unit 16 may be prepared by the following method in place of the method of the embodiment described above.

First, in order to determine a phase distribution to be displayed on the first phase modulation unit 12, information on an intensity distribution $I_{1in}$ (an amplitude distribution $A_{1in}$) of the light $P_1$ incident into the first phase modulation unit 12 is acquired. Next, an intensity distribution $I_{2in}$ (an amplitude distribution $A_{2in}$) of the light $P_2$ to be incident into the second phase modulation unit 14 is set. Then, after the intensity distributions $I_{1in}$ and $I_{2in}$ (the amplitude distributions $A_{1in}$ and $A_{2in}$) are acquired, a first phase pattern including the phase distribution $\phi_1$ to be displayed on the first phase modulation unit 12 is determined by use of, for example, an iterative Fourier method such as a GS method or an OC method, or a CGH design method such as an ORA method.

In addition, in the case where a phase distribution $\phi_{1in}$ of the light $P_1$ to be incident into the first phase modulation unit 12 is a plane wave, $\phi_1 = \phi_{1out}$ ($\phi_{1out}$ is a phase pattern of the light $P_2$ emitted from the first phase modulation unit 12), meanwhile, when the phase distribution $\phi_{1in}$ is not a plane wave, it is preferable to determine the phase distribution $\phi_1$ of the first phase pattern to be displayed on the first phase modulation unit 12 by the following formula (4).

[Formula 4]

$$\phi_1 = \phi_{1\_out} - \phi_{1\_in} \quad (4)$$

Due to the first phase modulation unit 12 displaying such a first phase pattern, the light $P_2$ having the desired intensity distribution $I_{2in}$ (the amplitude distribution $A_{2in}$) is to be incident into the second phase modulation unit 14 which is separated by the distance $L_1$ from the first phase modulation unit 12. In addition, a phase distribution $\phi_{2in}$ of the light $P_2$ incident into the second phase modulation unit 14 is determined on the basis of phase modulation in the first phase modulation unit 12, and a propagation process from the first phase modulation unit 12. This phase distribution $\phi_{2in}$ is determined by simulating a situation of propagation of the light $P_2$.

Next, a second phase pattern including a phase distribution $\phi_2$ to be displayed on the second phase modulation unit 14 is determined. In the present modification, a second phase pattern including a phase pattern for making the light $P_3$ output from the second phase modulation unit 14 into parallel light is determined. For example, in order to make the light $P_3$ emitted from the second phase modulation unit 14 into parallel light and a plane wave, the phase distribution $\phi_2$ is made into a reversed phase distribution with respect to the phase distribution $\phi_{2in}$ of light to be incident into the second phase modulation unit 14. That is, the phase distribution $\phi_2$ is determined by the following formula (5).

[Formula 5]

$$\phi_2 = -\phi_{2\_in} \quad (5)$$

Figure 7:
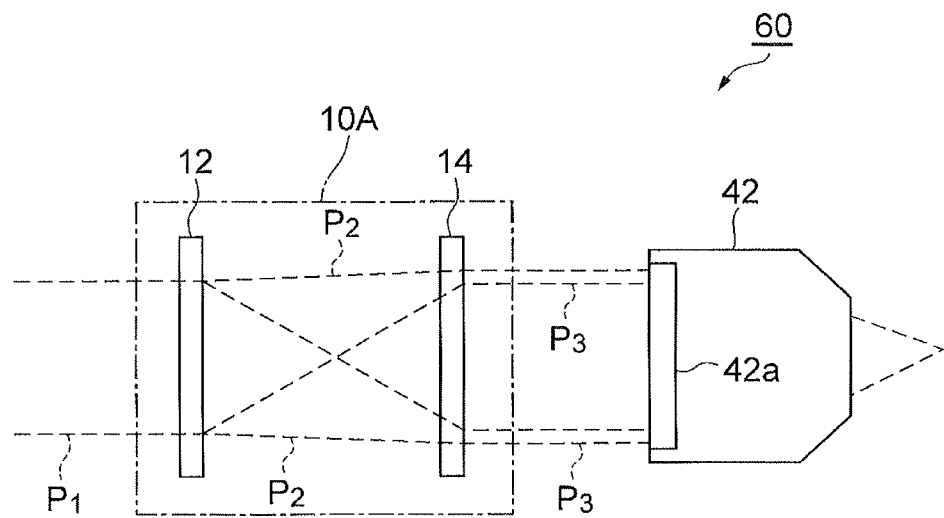
FIG. 7 is a diagram showing an example of an optical system used for a TIRF microscope.

Here, as a specific example of an optical system including the beam shaping device according to the present modification, a method of imaging by use of an ultrahigh-NA and high-magnification objective lens which is called a TIRF (Total Internal Reflection Fluorescence) microscope will be described. A TIRF microscope is a device which generates an evanescent field by totally reflecting laser light, to excite fluorescence. FIG. 7 is a diagram showing an example of an optical system used for a TIRF microscope. As shown in FIG. 7, this optical system 60 includes the beam shaping device 10A and an objective lens 42 for a TIRF microscope. In addition, at the preceding stage of the beam shaping device 10A, in the same way as the optical system 50 shown in FIG. 2, the laser light source 28, the spatial filter 32 (or a beam expander), and the collimating lens 34 are disposed. Further, this optical system 60 is the optical system on the excitation light side, however, it may also serve as an optical system on the observation side for observing fluorescence or the like.

In this optical system 60, an intensity distribution and a phase distribution of the input light $P_1$ are arbitrarily changed by the first phase modulation unit 12 and the second phase modulation unit 14, and output light $P_3$ is output from the back face of the second phase modulation unit 14. The output light $P_3$ is incident into an exit pupil 42a of the objective lens 42, to be condensed by the objective lens 42. At this time, it is preferable to set the first phase pattern and the second phase pattern such that a shape of a cross section perpendicular to the optical axis direction of the output light $P_3$ becomes an annular shape (a ring shape), to be incident into the vicinity of the peripheral portion of the exit pupil 42a of the objective lens 42.

Here, (a) in FIG. 8 is a diagram showing an example of excitation light in a conventional TIRF microscope, that schematically shows a situation in which the exit pupil 42a of the objective lens 42 is observed from the optical axis direction. Further, (b) in FIG. 8 is a diagram showing a situation of excitation light in the present modification, that schematically shows a situation in which the exit pupil 42a of the objective lens 42 is observed from the optical axis direction.

As shown in (a) in FIG. 8, in the conventional TIRF microscope, excitation light EX is made incident into a spot of a portion in the vicinity of the peripheral portion of the exit pupil 42a of the objective lens 42. On the other hand, in the present modification, as shown in (b) in FIG. 8, it is possible to bring annularly shaped (ring shaped) parallel light along the entire peripheral portion of the exit pupil 42a of the objective lens 42 to be incident into the objective lens 42 as excitation light EX. By thus shaping a shape of the excitation light EX, it is possible to more effectively generate an evanescent field for exciting fluorescence.

Figure 9:
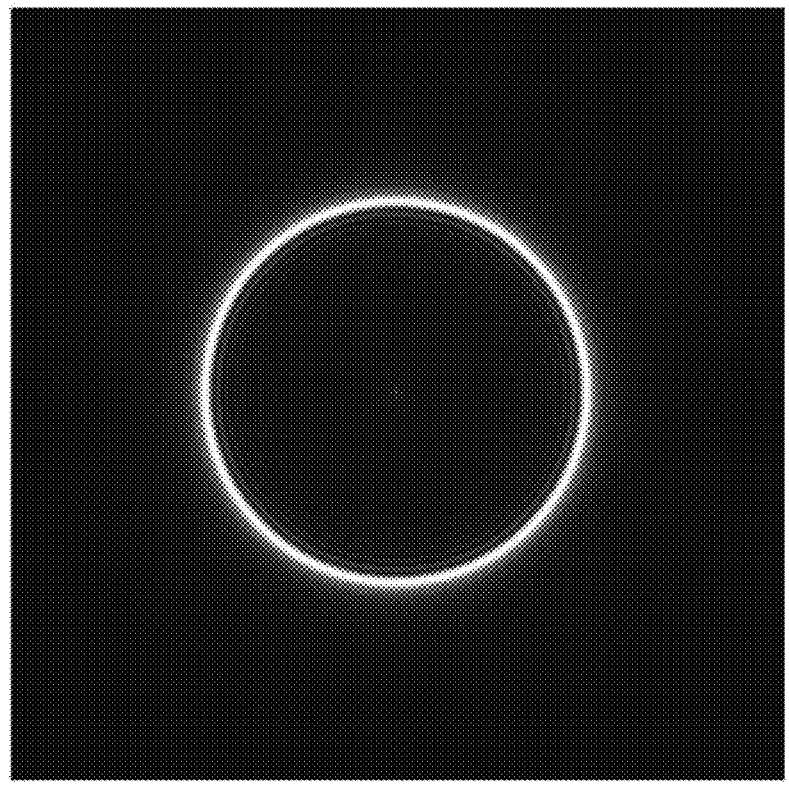
FIG. 9 is a diagram showing an example of an intensity distribution of light incident into the second phase modulation unit.
Figure 10:
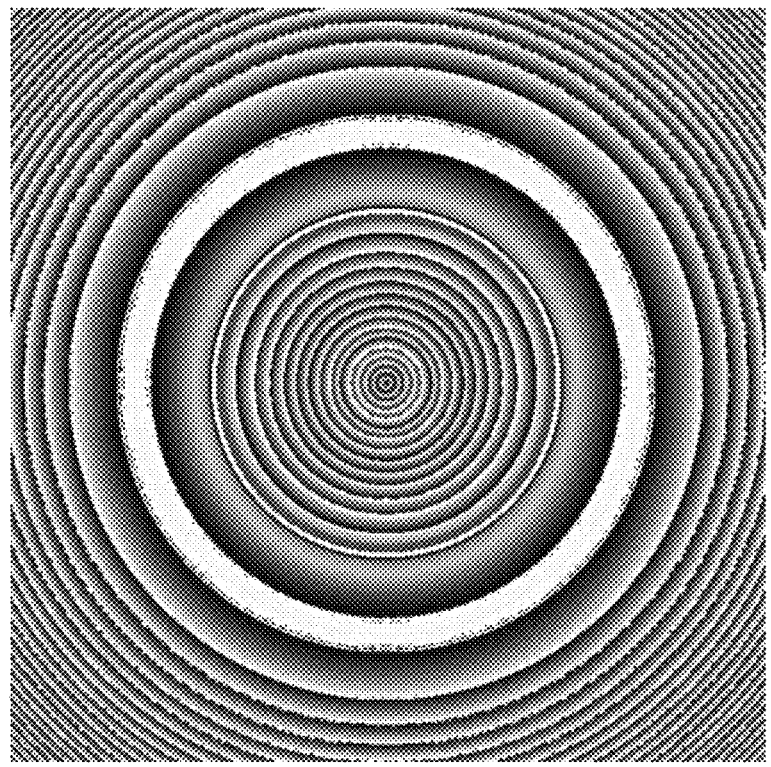
FIG. 10 is a diagram showing an example of a second phase pattern provided to the second phase modulation unit.

In order to output this annularly shaped excitation light EX from the beam shaping device 10A, the input light $P_1$ having an intensity distribution which is a Gaussian distribution is modulated by the first phase modulation unit 12, and the light $P_2$ having an intensity distribution, for example, as shown in. FIG. 9 is made incident into the second phase modulation unit 14. Then, a phase pattern as shown in FIG. 10 is provided as a second phase pattern to the second phase modulation unit 14. Thereby, the parallel light $P_3$ holding the intensity distribution shown in FIG. 9 is output from the second phase modulation unit 14. In addition, in the case where only one spatial light modulator is used, it is possible to prepare light having a ring-shaped intensity distribution as shown in FIG. 9, but this light is not output as parallel light.

In addition, the case where the light (excitation light) $P_3$ having a ring-shaped intensity distribution is prepared is exemplified in the above description, however, in accordance with the present modification, it is possible to prepare light having other various intensity distributions.

Further, the light $P_3$ output from the second phase modulation unit 14 is made into parallel light in the above description, however, the control unit 16 may provide a second phase pattern with which the light $P_3$ may be made into diverging light or converging light, to the second phase modulation unit 14.

Further, in the configuration shown in FIG. 7 as well, as shown in FIG. 6, the lens 18 may be provided between the first phase modulation unit 12 and the second phase modulation unit 14. The lens 18 condenses (or diffuses) the light $P_2$ emitted from the first phase modulation unit 12, to provide the light $P_2$ to the second phase modulation unit 14. There is a lower limit in a focal length of a lens which may be realized by a spatial light modulator, however, by combining the lens 18 in this way, it is possible to set a focal length in excess of the lower limit.

Fourth Modification

The first phase pattern and the second phase pattern which are respectively provided to the first phase modulation unit 12 and the second phase modulation unit 14 by the control unit 16 may be prepared by the following method in place of the method of the embodiment described above.

First, in order to determine a phase distribution of the light $P_3$ output from the second phase modulation unit 14, a target pattern $A_{tgt}$ is set. This target pattern $A_{tgt}$ is a light condensing pattern generated when light emitted from the second phase modulation unit 14 is converged by a lens or a lens effect of the phase. Further, an intensity distribution $I_{2in}$ (an amplitude distribution $A_{2in}$) of the light $P_2$ to be incident into the second phase modulation unit 14 is set. After the target pattern $A_{tgt}$ and the amplitude distribution $A_{2in}$ are set in this way, a phase distribution of the light $P_3$ output from the second phase modulation unit 14 is determined by use of, for example, an iterative Fourier method such as a GS method or an OC method, or, for example, a CGH design method such as an ORA method. In addition, the amplitude distribution $A_{2in}$ and the intensity distribution $I_{2in}$ of the light $P_2$ have the relationship shown in the following formula (6).

[Formula 6]

$$I_{2in} = |A_{2in}|^2 \quad (6)$$

Next, an intensity distribution $I_{1in}$ (an amplitude distribution $A_{1in}$) of the light $P_1$ to be incident into the first phase modulation unit 12 is set. Then, after the intensity distributions $I_{1in}$ and $I_{2in}$ (the amplitude distributions $A_{1in}$ and $A_{2in}$) are acquired, a first phase pattern including the phase distribution $\phi_1$ to be displayed on the first phase modulation unit 12 is determined by use of, for example, an iterative Fourier method such as a GS method or an OC method, or a CGH design method such as an ORA method. In addition, a phase distribution $\phi_{1out}$ of the light $P_2$ output from the first phase modulation unit 12 is a phase distribution $\phi_1$ when the wave front of light incident into the first phase modulation unit 12 is parallel light, and it is preferable to determine a phase distribution $\phi_2$ to be displayed on the second phase modulation unit 14 by the following formula (7).

[Formula 7]

$$\phi_2 = \phi_{2out} - \phi_{2in} \quad (7)$$

In addition, the phase distribution $\phi_{2out}$ is determined by simulating a situation of propagation of the light $P_2$.

Effects obtained by the beam shaping device according to the first embodiment and the respective modifications described above will be described.

In the beam shaping device 10A (10B) according to the first embodiment and the respective modifications, the first phase modulation unit 12 and the second phase modulation unit 14 which are respectively composed of phase-modulation type spatial light modulators are optically coupled, and input light $P_1$ is made incident into the first phase modulation unit 12, and output light $P_3$ is taken out of the second phase modulation unit 14. Then, the first phase pattern for providing a predetermined intensity distribution is displayed on the first phase modulation unit 12, the light $P_2$ having the predetermined intensity distribution is made incident into the second phase modulation unit 14, and a predetermined phase distribution is provided to the second phase modulation unit 14, thereby the output light $P_3$ with an arbitrary cross sectional shape and an arbitrary intensity distribution is obtained.

In this way, by using two phase-modulation type spatial light modulators, it is possible to arbitrarily control not only a phase distribution, but also an intensity distribution. That is, in accordance with this beam shaping device 10A (10B), it is possible to perform conversion into light with an arbitrary (dynamic) cross sectional shape and intensity distribution. For example, it is possible to condense light in an arbitrary condensed light shape, and further, it is possible to change an intensity distribution of the input light $P_1$, to output the light $P_3$ in a state of parallel light, condensing light, or diverging light.

Further, as the configurations described in Non-Patent Documents 1 and 2, when a spatial light modulator is disposed on a Fourier plane, for example, for the purpose of using laser light of light intensity, light may be concentrated on one portion of the spatial light modulator, which may deteriorate the function of the spatial light modulator. On the other hand, in the beam shaping device 10A (10B) according to the first embodiment and the respective modifications, the second phase modulation unit 14 is disposed so as to be separated from the Fourier plane of the first phase modulation unit 12 (that is, distance $L_1 \neq$ focal length f), and it is possible to make an arbitrary length as the distance $L_1$. Accordingly, it is possible to inhibit deterioration in function of the spatial light modulator composing the second phase modulation unit 14.

Second Embodiment

Figure 11:
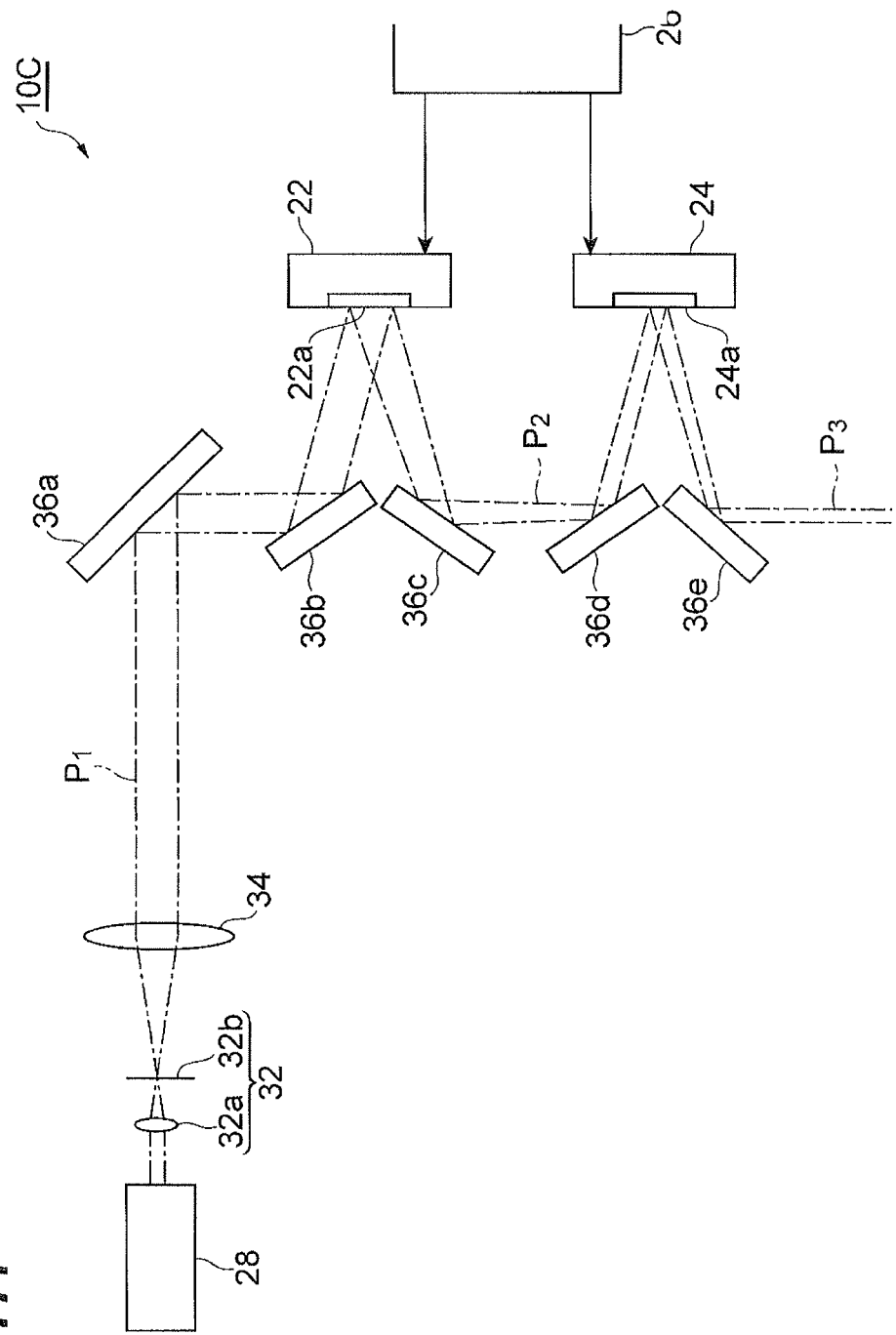
FIG. 11 is a diagram showing a configuration of a beam shaping device according to a second embodiment.

FIG. 11 is a diagram showing a configuration of a beam shaping device 10C according to a second embodiment of the present invention. The beam shaping device 10C according to the present embodiment includes a first phase modulation unit 22, a second phase modulation unit 24, and a control unit 26. The first phase modulation unit 22 and the second phase modulation unit 24 are composed of reflection type spatial light modulators, and respectively have light-reflecting surfaces 22a and 24a. Further, as shown in FIG. 11, the beam shaping device 10C may further include the laser light source 28, the spatial filter 32 (or a beam expander), the collimating lens 34, and reflecting mirrors 36a to 36e serving as reflective elements.

In the present embodiment, the second phase modulation unit 24 is optically coupled to the first phase modulation unit 22 according to a structure which will be described below. That is, the light-reflecting surface 24a of the second phase modulation unit 24 is optically coupled to the light-reflecting surface 22a of the first phase modulation unit 22 via the reflecting mirrors 36d and 36c serving as a plurality of reflective elements, and is simultaneously optically coupled to the reflecting mirror 36e. Further, the input light $P_1$ is input to the light-reflecting surface 22a of the first phase modulation unit 22 via the reflecting mirrors 36b and 36a. The input light $P_1$ is appropriately generated, for example, such that laser light emitted from the laser light source 28 passes through the condensing lens 32a and the pinhole 32b of the spatial filter 32 so as to eliminate wavefront noise and distortion, and thereafter passes through the collimating lens 34, to be parallelized.

The control unit 26 provides the respective first phase pattern and the second phase pattern to the first phase modulation unit 22 and the second phase modulation unit 24, respectively. In detail, the control unit 26 provides an electrical signal (a phase pattern) for driving the respective pixels of the spatial light modulators to the first phase modulation unit 22 and the second phase modulation unit 24. In the beam shaping device 10C, the control unit 26 changes the phase patterns for the first phase modulation unit 22 and the second phase modulation unit 24 in this way, thereby outputting the light $P_3$ having an arbitrary intensity distribution and an arbitrary phase distribution. In addition, the control unit 26 may be disposed in a housing in which the first phase modulation unit 22 and the second phase modulation unit 24 are housed, or may be disposed outside the housing.

As in the present embodiment, the first phase modulation unit and the second phase modulation unit may be composed of reflection type spatial light modulators. In such a case as well, it is possible to exert the same effects as those in the aforementioned first embodiment.

MODIFICATION

Figure 12:
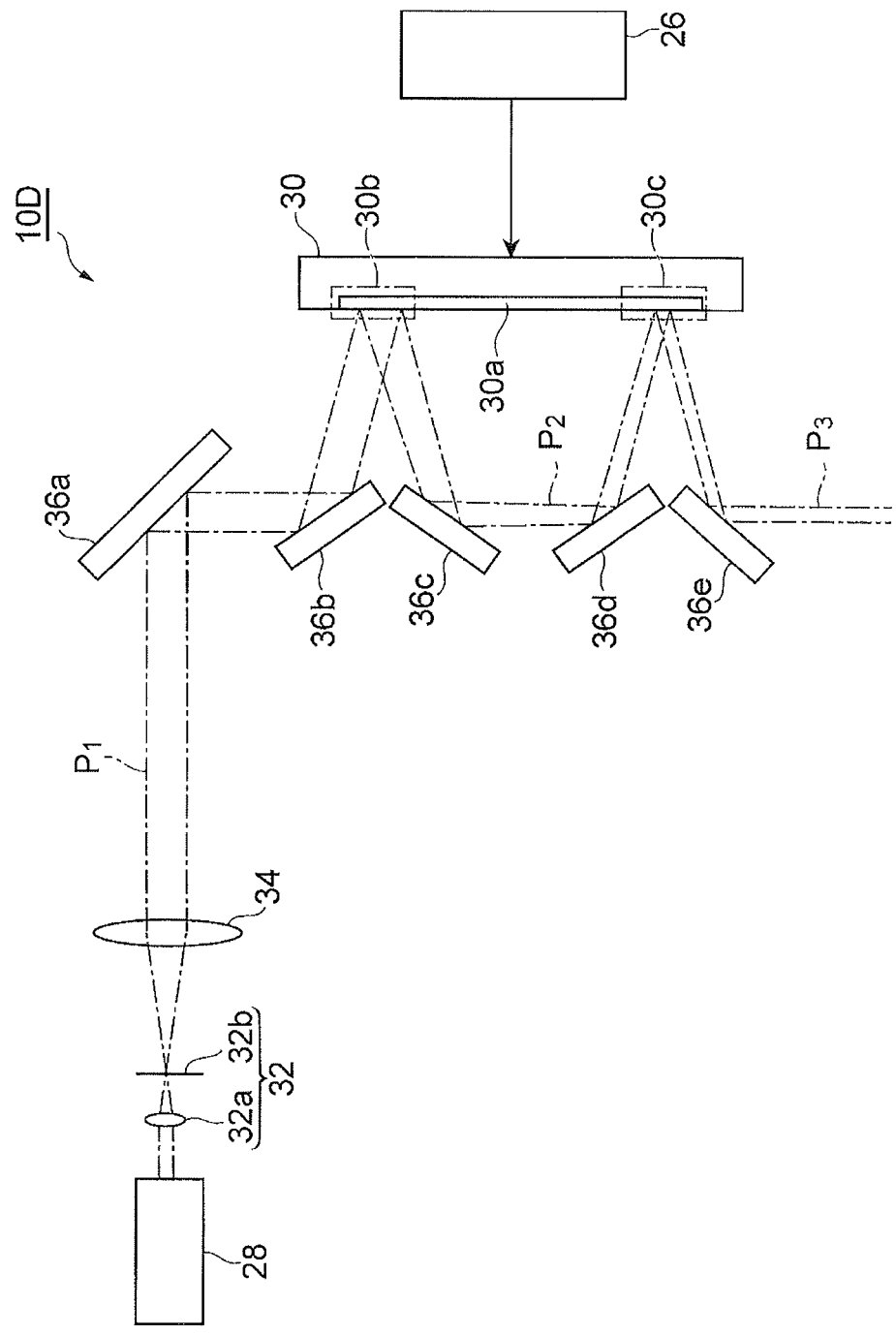
FIG. 12 is a diagram showing a configuration of one modification of the beam shaping device according to the second embodiment.

FIG. 12 is a diagram showing a configuration of a beam shaping device 10D as a modification according to the second embodiment. A point of difference between the beam shaping device 10D according to the present modification and the second embodiment is the configurations of the first phase modulation unit and the second phase modulation unit. That is, in the present modification, the beam shaping device 10D includes one reflection type spatial light modulator 30, and the first phase modulation unit and the second phase modulation unit are composed of the single reflection type spatial light modulator 30, and a partial region (a first region) of its light-reflecting surface 30a is used as a first phase modulation unit 30b, and another partial region (a second region) is used as a second phase modulation unit 30c. In the present modification, the second modulation unit 30c is optically coupled to the first phase modulation unit 30b via the reflecting mirrors 36d and 36c, and is simultaneously optically coupled to the reflecting mirror 36e. Further, the input light $P_1$ which is parallel light is input to the first phase modulation unit 30b via the reflecting mirrors 36b and 36a.

The control unit 26 provides an electrical signal (a phase pattern) for driving the respective pixels of the spatial light modulator 30, to the spatial light modulator 30, thereby providing the respective first phase pattern and the second phase pattern to the first phase modulation unit 30b and the second phase modulation unit 30c, respectively. In the beam shaping device 10D, the control unit 26 changes the phase patterns for the first phase modulation unit 30b and the second phase modulation unit 30c in this way, thereby outputting the light $P_3$ having an arbitrary intensity distribution and an arbitrary phase distribution.

As in the present modification, the first phase modulation unit and the second phase modulation unit may be composed of a single spatial light modulator in common with each other. In such a case as well, it is possible to exert the same effects as those in the aforementioned first embodiment.

Figure 13:
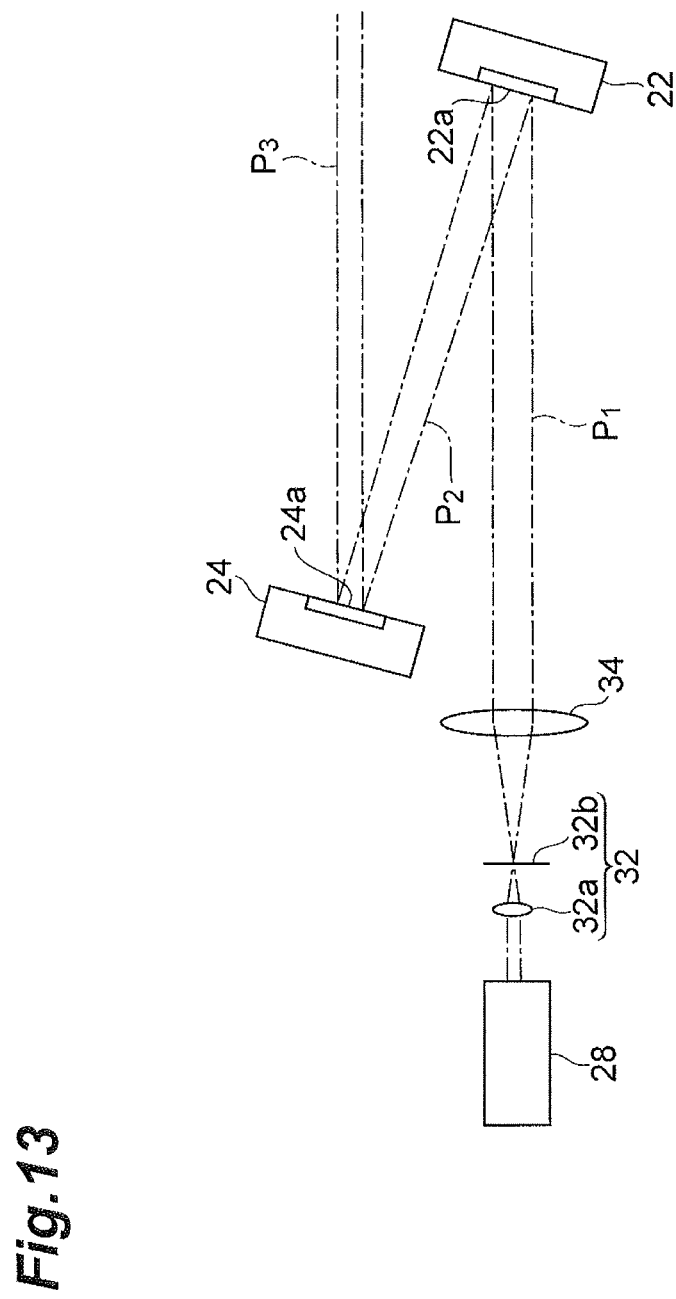
FIG. 13 is a diagram showing a configuration of another modification of the beam shaping device according to the second embodiment.

Further, in the second embodiment and the modification, as an optical system in which light is incident into and emitted from the first phase modulation unit and the second phase modulation unit, a variety of configurations other than the configurations shown in FIG. 11 and FIG. 12 are possible. For example, an expander may be provided in place of the spatial filter 32 and the collimating lens 34, and the reflecting mirrors 36a to 36e may be replaced with other light reflective optical components such as a triangular prism. Further, as shown in FIG. 13, a configuration without use of reflecting mirrors is also possible. Further, in the configuration of FIG. 13, the reflection type spatial light modulator composing the first phase modulation unit 22 and the reflection type spatial light modulator composing the second phase modulation unit 24 are preferably disposed such that their light-reflecting surfaces 22a and 24a are parallel to one another. In this case, it is possible to make input light and output light substantially parallel, and make the device relatively compact.

A beam shaping device according to the present invention is not limited to the above-described embodiments, and other various modifications are possible. For example, in the above-described embodiments and modifications, the case in which the light to be incident into the first phase modulation unit is parallel light is exemplified, meanwhile, the light to be incident into the first phase modulation unit is not limited to parallel light, and various light beams may be applied.

Further, in the respective embodiments described above, the objective lens is exemplified as an optical component provided at the subsequent stage of the second phase modulation unit, meanwhile, not only an objective lens, but also various optical components may be provided at the subsequent stage of the second phase modulation unit of the beam shaping device according to the present invention.

Further, in the respective embodiments described above, the configuration in which the beam shaping device includes the two phase modulation units (spatial light modulators) is exemplified, meanwhile, the beam shaping device according to the present invention may include three or more phase modulation units (spatial light modulators). Further, a hologram pattern may be superimposed on a phase pattern to be presented on the second phase modulation unit 14. In accordance with this, after modulating an amplitude to an arbitrary amplitude, it is possible to modulate its phase as well.

A beam shaping device according to the above-described embodiment includes a first phase modulation unit which is composed of a phase-modulation type spatial light modulator, and displays a first phase pattern for modulating a phase of input light, a second phase modulation unit which is composed of a phase-modulation type spatial light modulator, is optically coupled to the first phase modulation unit, and displays a second phase pattern for further modulating a phase of light phase-modulated by the first phase modulation unit, and a control unit which provides the first phase pattern and the second phase pattern to the first phase modulation unit and the second phase modulation unit, respectively, and in the beam shaping device, the first phase pattern and the second phase pattern are phase patterns for approximating an intensity distribution and a phase distribution of light output from the second phase modulation unit, to predetermined distributions.

Further, in the beam shaping device, the second phase pattern may include a phase pattern for making the light output from the second phase modulation unit, into parallel light, diffusing light, or converging light.

Further, in the beam shaping device, a shape of a cross section perpendicular to an optical axis direction of the light output from the second phase modulation unit may be a polygonal shape, and an intensity distribution of the light in the cross section may be a top-hat shape.

Further, in the beam shaping device, a shape of a cross section perpendicular to an optical axis direction of the light output from the second phase modulation unit may be an annular shape.

Further, in the beam shaping device, the first phase modulation unit and the second phase modulation unit may respectively include reflection type spatial light modulators. Further, in this case, the reflection type spatial light modulator composing the first phase modulation unit and the reflection type spatial light modulator composing the second phase modulation unit may be disposed such that their light-reflecting surfaces are parallel to one another.

Further, in the beam shaping device, the first phase modulation unit and the second phase modulation unit may include a single reflection type spatial light modulator, and a partial region of its light-reflecting surface may be used as the first phase modulation unit, and another partial region may be used as the second phase modulation unit.

Further, the beam shaping device may be configured to include a plurality of reflective elements, the beam shaping device in which the second phase modulation unit is optically coupled to the first phase modulation unit via the plurality of reflective elements.

Further, the beam shaping device may be configured such that the spatial light modulator is a transmission type spatial light modulator.

Further, the beam shaping device may be configured such that the second phase pattern cancels the phase of the light phase-modulated by the first phase modulation unit.

INDUSTRIAL APPLICABILITY

The present invention is applicable as a beam shaping device which is capable of conversion into light with an arbitrary cross sectional shape and an arbitrary intensity distribution.

REFERENCE SIGNS LIST 10A to 10D—beam shaping device, 12, 22—first phase modulation unit, 14, 24—second phase modulation unit, 16—control unit, 18—lens, 26—control unit, 28—laser light source, 30—reflection type spatial light modulator, 30b—first phase modulation unit, 30c—second phase modulation unit, 32—spatial filter, 34—collimating lens, 36a to 36e—reflecting mirror, 40, 42—objective lens, 42a—exit pupil, 50, 60—optical system, A—optical axis, B—object, EX—excitation light, $P_1$—input light, $P_2$—light, $P_3$—output light.

The invention claimed is:

1. A beam shaping device comprising:
a first phase modulation unit including a phase-modulation type spatial light modulator, and displaying a first phase pattern for modulating a phase of input light;
a second phase modulation unit including a phase-modulation type spatial light modulator, being optically coupled to the first phase modulation unit, and displaying a second phase pattern for further modulating a phase of light phase-modulated by the first phase modulation unit; and
a control unit configured to provide the first phase pattern and the second phase pattern to the first phase modulation unit and the second phase modulation unit, respectively, wherein
the first phase pattern and the second phase pattern are phase patterns for approximating an intensity distribution and a phase distribution of light output from the second phase modulation unit, to predetermined distributions, and wherein
the first phase modulation unit and the second phase modulation unit are composed of a single reflection type spatial light modulator having a single light-reflecting surface, and a partial region of the single light-reflecting surface is used as the first phase modulation unit, and another partial region of the single light-reflecting surface is used as the second phase modulation unit.

2. The beam shaping device according to claim 1, comprising a plurality of reflective elements, wherein the second phase modulation unit is optically coupled to the first phase modulation unit via the plurality of reflective elements.

3. The beam shaping device according to claim 1, wherein the second phase pattern cancels the phase of the light phase-modulated by the first phase modulation unit.

4. The beam shaping device according to claim 1, wherein the second phase pattern includes a phase pattern for making the light output from the second phase modulation unit, into parallel light, diffusing light, or converging light.

5. The beam shaping device according to claim 1, wherein a shape of a cross section perpendicular to an optical axis direction of the light output from the second phase modulation unit is a polygonal shape, and an intensity distribution of the light in the cross section is a top-hat shape.

6. The beam shaping device according to claim 1, wherein a shape of a cross section perpendicular to an optical axis direction of the light output from the second phase modulation unit is an annular shape.

* * * * *